(12) United States Patent
Zhang et al.

(10) Patent No.: US 10,389,526 B2
(45) Date of Patent: Aug. 20, 2019

(54) METHODS FOR QUANTUM KEY DISTRIBUTION AND RELATED DEVICES

(71) Applicant: Massachusetts Institute of Technology, Cambridge, MA (US)

(72) Inventors: Zheshen Zhang, Somerville, MA (US); Franco N. C. Wong, Lexington, MA (US); Jeffrey H. Shapiro, Sharon, MA (US); Quntao Zhuang, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 409 days.

(21) Appl. No.: 15/135,381

(22) Filed: Apr. 21, 2016

(65) Prior Publication Data

US 2017/0026175 A1 Jan. 26, 2017

Related U.S. Application Data

(60) Provisional application No. 62/150,414, filed on Apr. 21, 2015.

(51) Int. Cl.
| | |
|---|---|
| *H04L 9/08* | (2006.01) |
| *H04B 10/079* | (2013.01) |
| *H04B 10/11* | (2013.01) |
| *H04B 10/25* | (2013.01) |

(52) U.S. Cl.
CPC ..... *H04L 9/0855* (2013.01); *H04B 10/07953* (2013.01); *H04B 10/11* (2013.01); *H04B 10/2504* (2013.01); *H04L 9/0852* (2013.01)

(58) Field of Classification Search
CPC .............. G06N 99/002; H04B 10/0793; H04L 9/0852; H04L 9/0819

USPC ......................................................... 380/256
See application file for complete search history.

(56) References Cited

U.S. PATENT DOCUMENTS

| | | | | |
|---|---|---|---|---|
| 5,568,301 | A * | 10/1996 | Tiemann | H04L 9/0838 380/54 |
| 7,627,126 | B1 | 12/2009 | Pikalo et al. | |
| 2001/0055389 | A1* | 12/2001 | Hughes | H04B 10/70 380/44 |
| 2002/0025041 | A1* | 2/2002 | Tomita | H04L 9/0662 380/256 |

(Continued)

OTHER PUBLICATIONS

Invitation to Pay Addition Fees for Application No. PCT/US2016/028697 dated Jul. 29, 2016.

(Continued)

*Primary Examiner* — Bryan F Wright
(74) *Attorney, Agent, or Firm* — Wolf, Greenfield & Sacks, P.C.

(57) ABSTRACT

A method for distributing a quantum digital key is described. The method comprises the use of an optical broadband source to generate an optical broadband signal. The optical broadband signal may be transmitted from a first party to a second party through an optical communication channel. The optical broadband signal may be transmitted with a low brightness, such as less than one photon/(sec-Hz), so as to be immune from passive attacks. Furthermore, a method for detecting the presence of active attackers is described. The method may comprise a coincidence measurement configured to measure the level of entanglement between an optical detection signal and an optical idler signal.

18 Claims, 6 Drawing Sheets

(56) References Cited

U.S. PATENT DOCUMENTS

| | | | | |
|---|---|---|---|---|
| 2005/0078827 A1* | 4/2005 | Tajima | ............... | H04B 10/70 380/256 |
| 2005/0094818 A1* | 5/2005 | Inoue | ............... | H04L 9/0858 380/278 |
| 2005/0111665 A1* | 5/2005 | Ichimura | ............... | H04L 9/0855 380/256 |
| 2007/0133798 A1* | 6/2007 | Elliott | ............... | H04B 10/70 380/255 |
| 2008/0240711 A1* | 10/2008 | Liu | ............... | H04B 10/0793 398/9 |
| 2008/0292102 A1* | 11/2008 | Wang | ............... | H04L 9/0852 380/275 |
| 2009/0046857 A1* | 2/2009 | Nambu | ............... | H04L 9/0852 380/255 |
| 2011/0019823 A1* | 1/2011 | Townsend | ............... | H04L 9/0852 380/256 |
| 2011/0280405 A1 | 11/2011 | Habif | | |
| 2014/0016779 A1* | 1/2014 | Lirakis | ............... | G06N 99/002 380/256 |
| 2015/0263853 A1* | 9/2015 | Gonzalez | ............... | H04L 9/0819 713/171 |
| 2015/0318918 A1* | 11/2015 | Bruno | ............... | H04B 10/0705 398/9 |
| 2017/0104595 A1* | 4/2017 | Huang | ............... | H04L 9/0861 |

OTHER PUBLICATIONS

International Search Report and Written Opinion for Application No. PCT/US2016/028697 dated Sep. 20, 2016.
Aspelmeyer et al., Long-distance quantum communication with entangled photons using satellites. J. Sel. Top. Quantum Electron 9. 2003: 1541-51.
Barzanjeh et al., Microwave quantum illumination Physical Review Letters 114. 2015; (080503):1-5.
Bennett et al., Quantum cryptography, public key distribution, and coin tossing. Proc. IEEE International Conf. on Computers, Systems, and Signal Process. 1984:5pgs.
Bonato et al., Feasibility of satellite quantum key distribution. New Journal of Physics. 2009; 11(045017):1-25.
Chandrasekaran et al., Photon information efficient communication through atmospheric turbulence—Part I: Channel model and propagation statistics. Journal of Lightwave Technology. 2014; (32.6): 1075-87.
Chandrasekaran et al., Photon information efficient communication through atmospheric turbulence—Part II: Bounds on ergodic classical and private capacities. Journal of Lightwave Technology. 2014; (32.6): 1088-97.
Gisin et al., Quantum Cryptography. Reviews of modern physics. 2002; (74.1): 145-95.
Grosshans et al., Continuous variable quantum cryptography using coherent states. Physical Review Letters. 2002; (88.5):057902-1-4.
Guha et al., Gaussian-state quantum-illumination receivers for target detection. Physical Review A. 2009;80(052310):1-4.
Kravtsov et al., Physical layer secret key generation for fiber-optic networks. Opt Express. 2013; 21(20): 23756-71.
Lance et al., No-switching quantum key distribution using broadband modulated coherent light. Phys Rev Lett. Oct. 28, 2005; 95(18):1-5.
Lee et al., Entanglement-based quantum communication secured by nonlocal dispersion cancellation. Physical Review A. 2014; (90.6)062331:1-6.
Lee et al., Finite-key analysis of high-dimensional time-energy entanglement-based quantum key distribution. Quantum Information Processing. 2015; 14(3): 1005-15.
Liu et al., Hybrid quantum private communication with continuous variable and discrete variable signals. Science China Physics, Mechanics & Astronomy. 2014; 58(2)020301: 1-7.
Lloyd, Enhanced sensitivity of photodetection via quantum illumination. Science 321.5895. 2008: 1463-65.
Meyer-Scott et al., How to implement decoy-state quantum key distribution for a satellite uplink with 50 dB channel loss. Physical Review A. 2011; (84.6)062326:1-8.
Parenti et al., Experimental observations of channel reciprocity in single-mode free-space optical links. Optical Express 20.19. 2012: 21635-44.
Puryear et al., Reciprocity-enhanced optical communication through atmospheric turbulence—Part II: Communication architectures and performance. Journal of Optical Communication Networking. 2013; (5): 888-90.
Qi et al., Feasibility of quantum key distribution through a dense wavelength division multiplexing network. New Journal of Physics. 2010; 12(10): 1-18.
Sasaki et al., Field test of quantum key distribution in the Tokyo QKD network. Optics Express. 2011; (19); 10387-409.
Shannon, Communication theory of secrecy systems. Bell System Technical Journal. 1949; (28.4): 656-715.
Shapiro, Defeating passive eavesdropping with quantum illumination Physical Review A. 2009; (80)022320: 1-5..
Shapiro et al., Reciprocity-enhanced optical communication through atmospheric turbulence—Part 1: Reciprocity proofs and far-field power transfer optimization. Journal of Optical Communications and Networking 4.12. 2012: 947-54.
Shapiro, Scintillation has minimal impact on far-field Bennett-Brassard 1984 protocol quantum key distribution. Physical Review A. 2011; (84.3)032340:1-6.
Shapiro et al., Secure communication via quantum illumination. Quantum Information Processing. 2014; (13.10): 2171-93.
Shapiro, Near-field turbulence effects on quantum key distribution. Physical Review A. 2003; (67.2)022309:1-7.
Shen et al., Experimental study on discretely modulated continuous-variable quantum key distribution. Physical Review A. 2010; 82(2): 1-7.
Shor, Polynomial-time algorithms for prime factorization and discrete logarithms on a quantum computer. Siam J. Comput. 1997; (26): 1484-1509.
Takeoka et al., Fundamental rate-loss tradeoff for optical quantum key distribution. Nature Communications 5. 2014:1-7.
Tan et al., Quantum illumination with Gaussian states. Physical Review Letters 101.25. 2008; 253601:1-4.
Toyoshima et al., Trends in satellite communication and the role of optical free-space communications. Journal of Optical Networking. 2005;4(6):300-11.
Wootters et al., A single quantum cannot be cloned. Nature Publishing Group. Oct. 1982;299(28):802-3.
Wozencraft et al., Principles of communication engineering. 1965: 511-24.
Yune, Secure communication through free-space channel using quantum illumination S.M. thesis, Massachusetts Institute of Technology. Jun. 2014:1-67.
Zhang et al., Entanglement's benefit survives an entanglement-breaking channel. Physical Review Letters III. 2013;(010501):1-5.
Zhang et al., Entanglement-enhanced sensing in lossy and noisy environment. Physical review letters. 2015; (114.11)110506:1-6.
Zhong et al., Photon-efficient quantum key distribution using time-energy entanglement with high-dimensional encoding. New Journal of Physics. 2015; (17.2)022002:1-10.
PCT/US2016/028697, Jul. 29, 2016, Invitation to Pay Additional Fees.
PCT/US2016/028697, Sep. 20, 2016, International Search Report and Written Opinion.

* cited by examiner

METHODS FOR QUANTUM KEY DISTRIBUTION AND RELATED DEVICES

RELATED APPLICATIONS

This Application claims priority under 35 U.S.C. § 119(e) to U.S. Provisional Application Ser. No. 62/150,414, entitled "QUANTUM-SECURE DIRECT COMMUNICATION AND KEY DISTRIBUTION WITH BROADBAND HOMODYNE RECEPTION AND CHANNEL MONITORS" filed on Apr. 21, 2015, which is herein incorporated by reference in its entirety.

FEDERALLY SPONSORED RESEARCH

This invention was made with Government support under Contract No. FA8721-05-C-0002 awarded by the U.S. Air Force, under Grant No. FA9550-14-1-0052 awarded by the Air Force Office of Scientific Research, under Grant No. N00014-13-1-0774 awarded by the Office of Naval Research. The Government has certain rights in the invention.

BACKGROUND

Communication networks, such as fiber optics networks and wireless networks, often utilize cryptography to increase communication security and to prevent third parties from intercepting private messages. Modern cryptography is based on mathematical theories designed to make exchange of information extremely difficult to break. For example, cryptographic keys, often referred to simply as "keys", are used to encrypt messages. Encryption algorithms which use the same key for both encryption and decryption are known as symmetric key algorithms. Contrarily, asymmetric key algorithms use one key for encryption and another key for decryption.

To improve the effectiveness of the algorithms, keys are often as long as the message. Nonetheless, as computers become faster, the ability to break keys increases. In some circumstances, the data rate at which the message is transmitted may be decreased to allow for the simultaneous transmission of the key.

BRIEF SUMMARY

According to one aspect of the present application, method for distributing a quantum digital key is provided. The method may comprise generating an optical broadband signal with an optical broadband source, transmitting a first portion of the optical broadband signal with less than one photon/(sec-Hz) through a first optical communication channel, time-delaying a second portion of the optical broadband signal with an optical delay element, receiving a modulated optical broadband signal encoded with the quantum digital key through a second optical communication channel, and obtaining the quantum digital key by mixing the modulated optical broadband signal with the delayed second portion of the optical broadband signal.

In some embodiments, the second portion of the optical broadband signal is time-delayed by an amount that is substantially equal to a roundtrip delay, plus or minus a mismatch error that is less than a coherence time of the optical broadband source.

In some embodiments, the optical broadband signal has an optical bandwidth that is at least ten times greater than a modulation rate associated with the modulated optical broadband signal.

In some embodiments, the first optical communication channel comprises a first optical fiber and the second optical communication channel comprises a second optical fiber.

In some embodiments, the first optical communication channel and the second optical communication channel define a free space optical link.

In some embodiments, the modulated optical signal exhibits a signal-to-noise ratio that is less than 1.

In some embodiments, the first portion of the optical broadband signal has a brightness that is between $10^{-4}$ photons/(sec-Hz) and 1 photon/(sec-Hz).

In some embodiments, the second portion of the optical broadband signal has a brightness that is greater than 10 photons/(sec-Hz).

In some embodiments, the method further comprises generating an optical idler signal and an optical detection signal such that the optical idler signal and the optical detection signal are temporally correlated; transmitting the optical detection signal through the first optical communication channel; and monitoring the first optical communication channel by performing a coincidence measurement.

In some embodiments, performing the coincidence measurement comprises obtaining a value representing an intrusion signal by comparing a first photon count associated with the optical idler signal with a second photon count associated with the optical broadband signal.

In some embodiments, the method further comprises determining that an active attack has occurred if the value representing the intrusion signal is greater than a threshold.

In some embodiments, the optical detection signal spectrally overlaps, at least in part, the optical broadband signal.

According to another aspect of the present application, an apparatus is provided. The apparatus may comprise an optical broadband source optically coupled to an optical communication channel, wherein the optical broadband source is configured to generate an optical broadband signal and to transmit a first portion of the optical broadband signal through the optical communication channel; an optical delay element optically coupled to the optical broadband source, wherein the optical delay element is configured to delay a second portion of the optical broadband signal generated by the optical broadband source; and an optical receiver optically coupled to the optical delay element, wherein the optical receiver is configured to obtain a quantum digital key by mixing the delayed second portion of the optical broadband signal with a modulated optical broadband signal.

In some embodiments, the optical delay element exhibits a time delay that is substantially equal to a roundtrip delay, plus or minus a mismatch error that is less than a coherence time of the optical broadband source.

In some embodiments, the optical broadband source comprises an erbium-doped fiber amplifier (EDFA).

In some embodiments, the apparatus further comprises a photon-pair source configured to generate an optical detection signal and an optical idler signal, wherein the optical detection signal and the optical idler signal are entangled; a single photon detector optically coupled to the photon-pair source, wherein the single photon detector is configured to count photons associated with the optical idler signal; a beam combiner configured to couple the first portion of the optical broadband signal with the optical detection signal.

In some embodiments, the photon-pair source comprises a spontaneous parametric downconverter (SPDC).

According to another aspect of the present application, a method for detecting an active attack to an optical communication channel is provide. The method may comprise generating an optical idler signal and an optical detection signal such that the optical idler signal and the optical detection signal are temporally correlated; transmitting the optical detection signal through an optical communication channel; and monitoring the optical communication channel by performing a coincidence measurement between the optical idler signal and the optical detection signal.

In some embodiments, performing the coincidence measurement comprises obtaining a value representing an intrusion signal by comparing a first photon count associated with the optical idler signal with a second photon count associated with the optical detection signal.

In some embodiments, the method further comprises determining that the active attack has occurred if the value representing the intrusion signal is greater than a threshold.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

The inventors have appreciated that immunity against passive attacks, aimed at intercepting the transmission of a digital key, may be achieved by transmitting the key with an optical signal having low brightness, such as less than one photon/(sec-Hz). As defined herein, "passive attacks" are attempts to gain knowledge of a key performed by measuring the signals encoded with the key. For example, a passive attacker may tap an optical signal propagating along an optical communication channel, such as an optical fiber, and may attempt to extrapolate the key.

Such a low-brightness optical signal may be too noisy to be detected by a passive attacker. At the same time, an intended listener may recover the key by mixing the low-brightness optical signal with an optical signal having high brightness, such as more than one photon/(sec-Hz). Recovery of the key may be enabled by the fact that the low-brightness and the high-brightness optical signals are temporally correlated with respect to one another. Immunity to attacks may be granted by the fact that passive attackers may not have access to such correlated high-brightness optical signal. According to one aspect of the present application, even if the passive attacker had access to a source of bright optical signals identical to that used by the intended listener, a signal generated by such source may not have a large enough correlation, with respect to the signal having the key encoded therein, to extrapolate the key.

On the other hand, "active attacks" are attempts to gain knowledge of a key by deceiving the intended listener. For example, an active attacker may attempt to deceive the party located at the first end of a channel, by emulating such party's transmission to the party located at the second end of the channel. In some circumstances, the party receiving the active attack may view the attacker as the "trusted" party, and may not realize an attack is under way.

The inventors have appreciated that active attacks aimed at breaking quantum key distribution (QKD) may perturb the optical communication channel, and the presence of an active attacker may be detected by sensing such "perturbation".

Quantum key distribution (QKD) uses the principles of quantum mechanics to ensure secure communications. The primary objective of quantum key distribution is to securely distribute a key to an intended listener, while preventing unintended listeners from intercepting the key. The key may subsequently be used to transform data, such as text, to an encrypted code. Often, unintended listeners may attempt to obtain the key by intercepting signals transmitted on a communication channel. According to one aspect of the present application, the integrity of a communication channel may be monitored by measuring the photon coincidences between signals on either sides of the channel. In some embodiments, the party, which will be referred to herein as "Alice", located at the first end of an optical communication channel, may generate a pair of signals with time-coincident photons. The first signal may be retained within Alice, and the second signal may be transmitted to a party, which will be referred to herein as "Bob", located at the second end of the optical communication channel. By measuring photonic coincidences between the first signal, within Alice, and the second signal, within Bob, the integrity of the optical communication channel may be monitored. In some embodiments, when the level of photon coincidence is less than a predefined value, the system may conclude that an active attack is under way. In such circumstances, Alice and Bob may agree to discontinue the transmission of the key.

Various encryption techniques utilize up to one bit for the key for each bit of data. In one-time pad (OTP) encryption, for example, each bit of data is paired with a key bit. Other encryption techniques may pair each bit of data with a plurality of key bits. Present communication systems are configured to transmit data at several gigabits per second. In order to preserve the desired data bits to key bits ratio, it is desirable to perform quantum key distribution at rates matching such data rates. Optical communication networks often include links designed to transmit signals over long distances. For example, a typical wide area network may include links of several tens, hundreds or even thousands of kilometers. Optical communication channels having such lengths may introduce signal attenuation due to propagation loss, which may hinder the transmission of keys at gigabits per second.

The inventors have further appreciated that the rates at which quantum key distribution is performed may be increased by utilizing an optical broadband source. Some embodiments provide a system for quantum key distribution configured to operate at high data rates, such as up to, or in excess of, 1 Gbit/s, over long communication distances, such as up to 100 km. According to one aspect of the present application, optical broadband sources of the type described herein may be used to generate multi-mode optical signals. In some embodiments, optical signals that exhibit a plurality of modes may be used to distribute a quantum key. As defined herein, "temporal modes", or simply "modes", refer to the degrees of freedom associated to a particular optical signal in the time domain. By spreading a pulse carrying a portion of a key across a plurality of temporal modes, the effect of propagation loss induced by the optical communication channel may be mitigated, thus increasing the channel's ability to transmit keys at high rates.

The embodiments described herein may be used individually, all together, or in any combination of two or more, as the application is not limited in this respect.

Figure 1A:
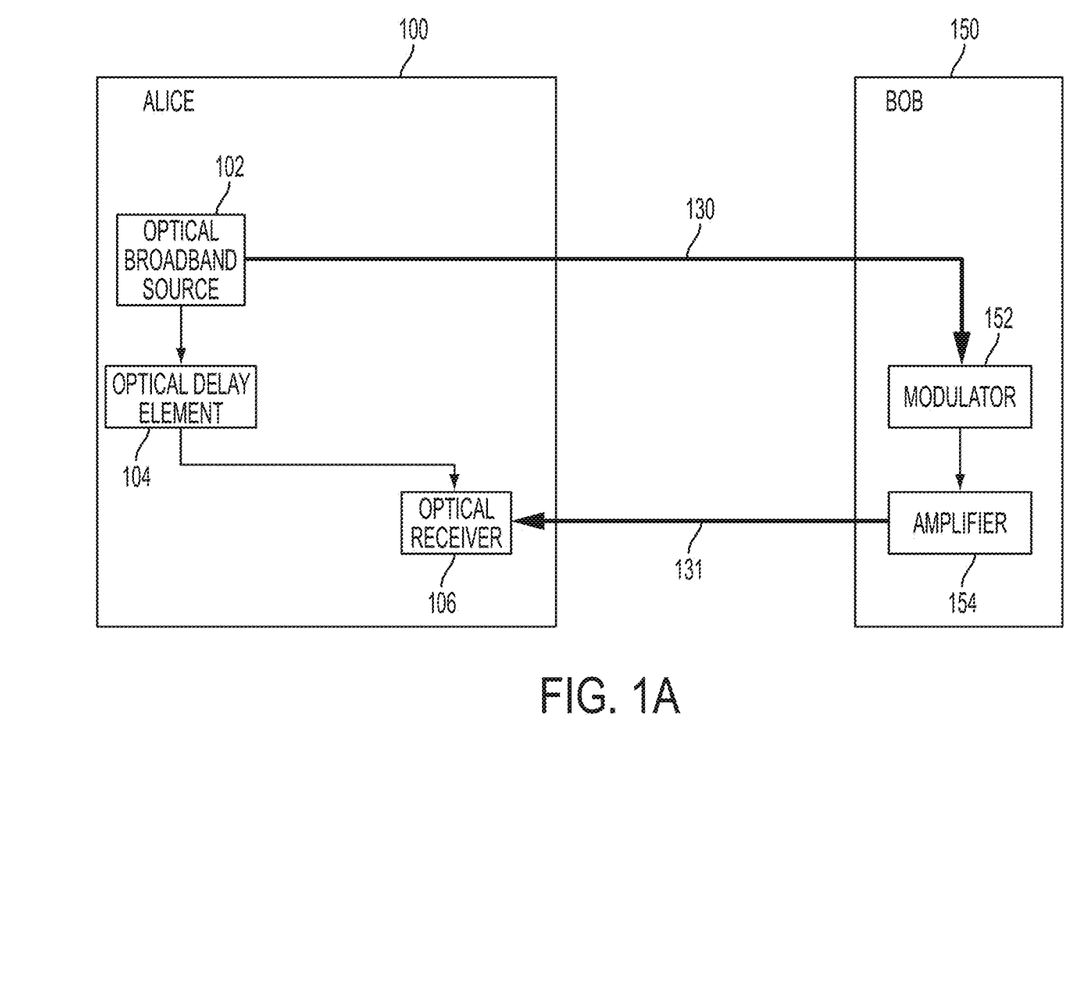
FIG. 1A is a block diagram illustrating an exemplary system for quantum key distribution, according to some non-limiting embodiments.

FIG. 1A is a block diagram of an exemplary system for quantum key distribution, according to some non-limiting embodiments. The system may comprise a transceiver 100, also referred to herein as "Alice" and a transceiver 150, also referred to herein as "Bob". Transceiver 100 may comprise an optical broadband source 102, an optical delay element 104, an optical receiver 106, or any suitable combination thereof. Optical broadband source 102 may be optically coupled to an optical communication channel 130 and optical receiver 106 may be optically coupled to an optical communication channel 131. As used herein, the phrase "optically coupled" indicates two or more components being configured to transmit, and/or receive, optical signals to/from one another. Optical delay element 104 may be optically coupled to optical broadband source 102 and optical receiver 106.

In some embodiments, optical communication channel 130 may comprise an optical fiber. In some embodiments, optical communication channel 131 may comprise an optical fiber. In some embodiments, optical communication channels 130 and 131 may define an optical fiber, which may be configured to operate bi-directionally. In other embodiments, optical communication channels 130 and 131 may define a free space optical link, such as a satellite-to-satellite-link, a ground-to-satellite link, a ground-to-ground link, or any other suitable type of optical wireless link. Optical communication channels 130 and 131 may be part of an optical network, such as a local area network (LAN), a metropolitan area network (MAN), a wide area network (WAN), or any other suitable type of network. Each optical communication channel may have a length between 10 m and 1000 km in some embodiments, between 100 m and 500 km in some embodiments, between 1 km and 1000 km in some embodiments, between 1 km and 500 km in some embodiments, between 1 km and 100 km in some embodiments, between 25 km and 100 km in some embodiments, or between any other suitable values or range of values. Other ranges are also possible.

Transceiver 150 may be positioned at the opposite end of the optical communication channels with respect to transceiver 100. Transceiver 150 may comprise a modulator 152, an amplifier 154, or any suitable combination thereof. Modulator 152 may be optically coupled to optical communication channel 130. In some embodiments, amplifier 154 may be optically coupled to optical communication channel 131 and to modulator 152.

Figure 2:
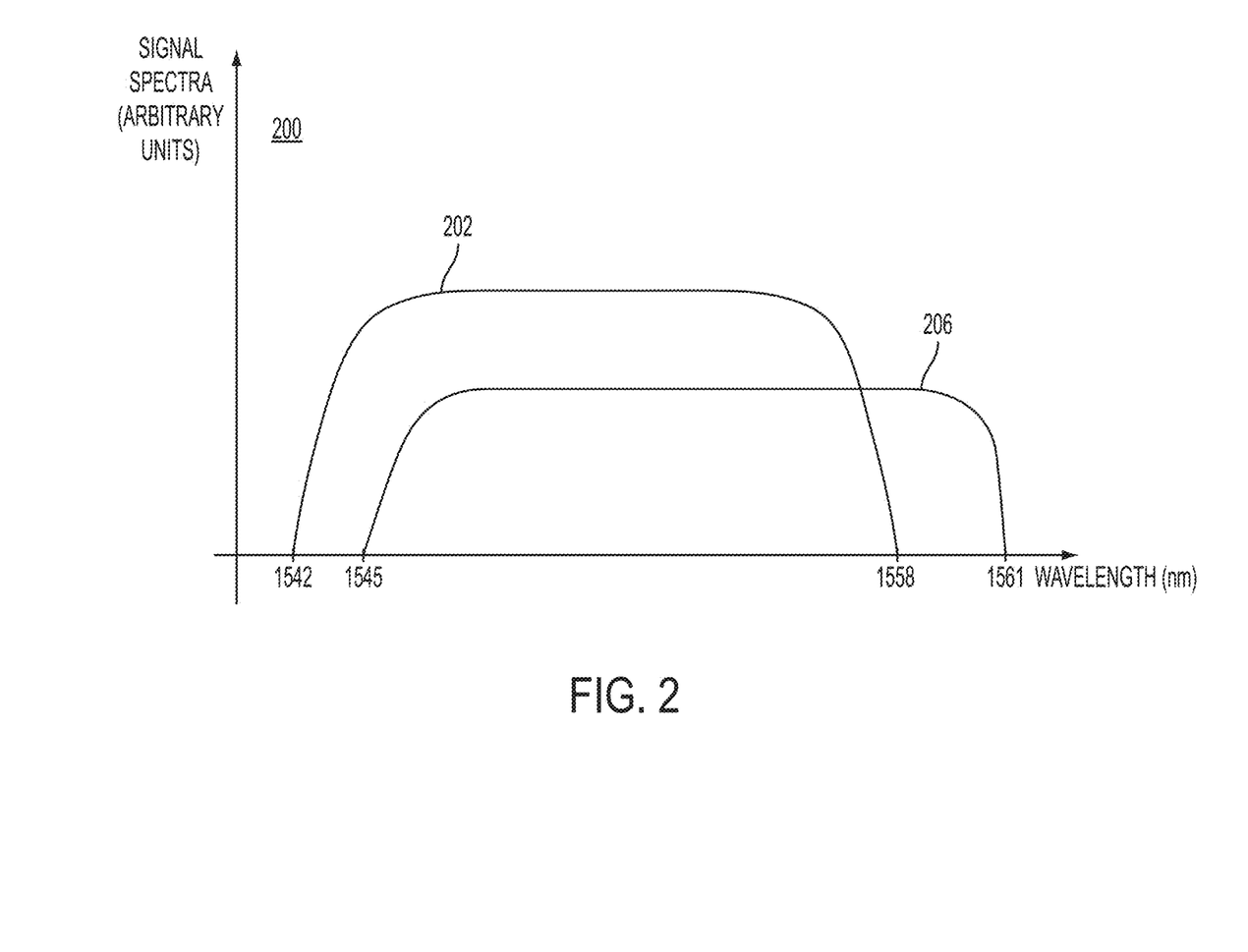
FIG. 2 is a plot illustrating a plurality of optical signal spectra, according to some non-limiting embodiments.

Optical broadband source 102 may be configured to generate optical broadband signals. By way of example and not limitation, an optical broadband signal generated by optical broadband source 102 may have an optical bandwidth, such as a 3 dB bandwidth, that is between 100 MHz and 8 THz in some embodiments, between 1 GHz and 8 THz in some embodiments, between 10 GHz and 8 THz in some embodiments, between 100 GHz and 8 THz in some embodiments, between 200 GHz and 4 THz in some embodiments, between 200 GHz and 2 THz in some embodiments, between 1 THz and 2 THz in some embodiments, or between any other suitable value or range of values. Other ranges are also possible. FIG. 2 is a plot illustrating an exemplary optical broadband signal spectrum 202, according to some non-limiting embodiments. Plot 200 illustrates signal spectra as functions of wavelength expressed in nanometers. As illustrated in the non-limiting example, the spectrum 202 of the optical broadband signal may span from 1542 nm to 1558 nm, corresponding to an optical bandwidth of approximately 2 THz.

Referring back to FIG. 1A, the output of optical broadband source 102 from which the optical broadband signal is generated may be coupled to an optical filter (not shown in FIG. 1A), such as a Fabry-Perot filter, a grating filter, a ring filter, or any other suitable type of filter. The optical filter may have an optical bandwidth, such as a 3 dB bandwidth, that is between 100 MHz and 8 THz in some embodiments, between 1 GHz and 8 THz in some embodiments, between 10 GHz and 8 THz in some embodiments, between 100 GHz and 8 THz in some embodiments, between 200 GHz and 4 THz in some embodiments, between 200 GHz and 2 THz in some embodiments, between 1 THz and 2 THz in some embodiments, or between any other suitable value or range of values. Other ranges are also possible.

Optical broadband source 102 may be configured to generate optical broadband signals having a carrier wavelength that is between 1500 nm and 1600 nm in some embodiments, between 1530 nm and 1580 nm in some embodiments, between 1540 nm and 1560 nm in some embodiments, between 1250 nm and 1400 nm in some embodiments, between 1280 nm and 1320 nm in some embodiments, or between any other suitable value or range of values. Other ranges are also possible. In some embodiments, optical broadband source 102 may comprise an amplified spontaneous emission (ASE) source, such as an erbium-doped fiber amplifier (EDFA).

The optical broadband signal generated by optical broadband source 102 may be separated into two portions, for example, using an optical power divider. The first portion of the optical broadband signal may be coupled to optical communication channel 130. The first portion of the optical broadband signal may exhibit low brightness. By way of example and not limitation, the brightness may be less than 1 photon/(sec-Hz) in some embodiments, between 0.0001 and 1 photon/(sec-Hz) in some embodiments, between 0.001 and 0.01 photon/(sec-Hz) in some embodiments, between 0.01 and 0.1 photon/(sec-Hz) in some embodiments, between 0.1 and 1 photon/(sec-Hz) in some embodiments, or between any other suitable values or range of values. Other ranges are also possible.

In some embodiments, the second portion of the optical broadband signal may be coupled to optical delay element 104. As will be discussed further below, the optical delay element may exhibit a delay matching the delay associated with a signal round trip. In some embodiments, optical delay element 104 may comprise an optical fiber, having a length configured to provide the desired delay. In some embodiments, optical delay element 104 may comprise a tunable delay module, such as a Bragg grating, a ring resonator, an apodized grating, a photonic crystal, or any other suitable type of tunable delay module. The tunable delay module may be coupled to a controller, which may be configured to adjust its delay. The second portion of the optical broadband signal may exhibit high brightness. By way of example and not limitation, the brightness may be more than 1 photon/(sec-Hz) in some embodiments, between 1 photon/(sec-Hz) and 10000 photon/(sec-Hz) in some embodiments, between 100 photon/(sec-Hz) and 10000 photon/(sec-Hz) in some embodiments, between 1000 photon/(sec-Hz) and 10000 photon/(sec-Hz) in some embodiments, or between any other suitable values or range of values. Other ranges are also possible.

The portion of the optical broadband signal transmitted via optical communication channel 130 may exhibit low brightness to prevent attackers from attempting to violate the communication between Alice and Bob. As will be discussed further below, keys encoded on optical signals having low number of photons/(sec-Hz) may be noisy, thus making it difficult for an attacker to extract the message. The low-brightness optical broadband signal may be received by transceiver 150, and may be coupled to modulator 152 in some embodiments. Modulator 152 may comprise a binary phase shift keying (BPSK) modulator in some embodiments, a binary frequency shift keying (BFSK) modulator in some embodiments, an amplitude shift keying (ASK) modulator in some embodiments, a quadrature amplitude modulator (QAM) in some embodiments, a minimum shift keying (MSK) modulator in some embodiments, or any other suitable amplitude, frequency and/or phase modulator. Other types of modulators are also possible.

Modulator 152 may modulate the signal received via optical communication channel 130 with a digital key. The digital key may comprise a public key and/or a private key, and may have a key size between 8 bits and 128 bits in some embodiments, between 128 bits and 1024 bits in some embodiments, between 1024 bits and 2048 bits in some embodiments, or greater than 2048 bits in some embodiments. The application is not limited to any particular type of encryption, and any suitable encryption algorithm may be employed. By way of example and not limitation, any suitable combination among the symmetric-key cryptography, Data Encryption Standard (DES), Advanced Encryption Standard (AES), one-time pad (OTP) or RSA algorithm may be used. The digital key may be encoded with a modulation rate that is between 1 MHz and 40 GHz in some embodiments, between 1 MHz and 10 GHz in some embodiments, between 10 MHz and 10 GHz in some embodiments, between 100 MHz and 10 GHz in some embodiments, between 1 GHz and 10 GHz in some embodiments, between 1 GHz and 40 GHz in some embodiments, or between any other suitable values or range of values. Other values are also possible.

Referring back to FIG. 1A, the modulated signal may be amplified with amplifier 154, in some embodiments. Amplifier 154 may comprise any suitable type of optical amplifier, such as an erbium-doped fiber amplifier (EDFA). The modulated signal may be amplified to offset the propagation loss experienced by the optical broadband signal along the optical communication channel 130 and/or the optical communication channel 131. In some embodiments, noise may be added to the modulated optical signal to mask the digital key from potential attackers. For example, amplifier 154 may be configured to provide amplified spontaneous emission (ASE) noise.

The modulated optical broadband signal may be transmitted back to Alice using optical communication channel 131. The modulated optical broadband signal may exhibit a signal-to-noise ratio (SNR) that is greater than $1/100$ in some embodiments, greater than $1/10$ in some embodiments, greater than 1 in some embodiments, or greater than any suitable value. The modulated optical broadband signal may exhibit a signal-to-noise ratio (SNR) that is less than $1/100$ in some embodiments, less than $1/10$ in some embodiments, less than $1/2$ in some embodiments, less than 1 in some embodiments, less than 10 in some embodiments, or less than any suitable value.

According to one aspect of the present application, the optical bandwidth of the modulated optical broadband signal may be greater than its modulation rate. By way of example, the ratio between the optical bandwidth and the modulation rate may be between 10 and 10000 in some embodiments, between 10 and 1000 in some embodiments, between 50 and 1000 in some embodiments, between 100 and 500 in some embodiments, between 100 and 300 in some embodiments, or between any other suitable values or range of values. Other values are also possible. In some embodiments, the modulated optical signal may exhibit a plurality of temporal modes. As defined herein, the number of temporal modes that the modulated optical broadband signal comprises is equal to the ratio between its optical bandwidth and its modulation rate. By way of example and not limitation, a modulated optical broadband signal having a 2 THz optical bandwidth and a 10 GHz modulation rate exhibits 200 temporal modes.

The modulated optical broadband signal may be received by Alice using optical receiver 106. Optical receiver 106 may be configured to mix the modulated optical broadband signal received via communication channel 131 with the delayed optical broadband signal obtained from optical delay element 104. Optical receiver 106 may comprise a homodyne receiver in some embodiments, a heterodyne receiver in some embodiments, or any other suitable type of receiver.

Figure 3:
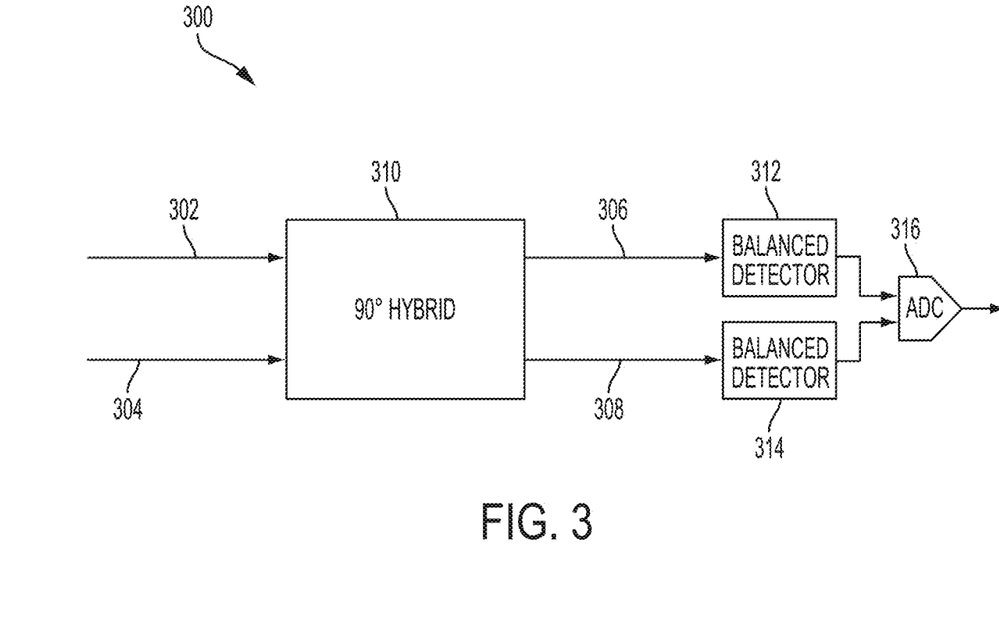
FIG. 3 is a block diagram illustrating an exemplary optical receiver, according to some non-limiting embodiments.

An exemplary optical receiver is illustrated in FIG. 3. Optical receiver 300 may comprise a 90° hybrid 310, balanced detectors 312 and 314, and analog-to-digital converter (ADC) 316. 90° hybrid 310 may comprise one or more optical couplers and one or more phase shifters and may be configured to provide output signals that are quadrature with respect to one another. The 90° hybrid may receive input 302, which may represent the modulated optical broadband signal obtained via optical communication channel 131, and input 304, which may represented the delayed optical broadband signal obtained from optical delay element 104. In some embodiments, The 90° hybrid may mix the inputs received, and may generate output 306, representing an in-phase demodulated component, and output 308, representing a quadrature demodulated component. The outputs may be provided to ADC 316, in some embodiments.

As described previously, the delay introduced by optical delay element 104 may be configured to match the delay experienced by the broadband signal in a round trip. A "round trip" may be defined herein as the optical path between optical broadband source 102 and receiver 106, passing through optical communication channels 130 and 131. In some embodiments, the delay provided by optical delay element 104 may be configured to be equal to the delay associated with the round trip. However, the delays may be partially mismatched in some embodiments. For example, the delays may exhibit a mismatch error that is less than 5% of the round trip delay, less than 2% of the round trip delay or less than 1% of the round trip delay. In some embodiments, the delays may have a mismatch error that is less than a coherence time associated with optical broadband source 102. As defined herein, the "coherence time" may be equal to the inverse of the optical bandwidth of optical broadband source 102.

Because the modulated optical broadband signal and the delayed optical broadband signal are generated by the same source, the two signals may be temporally correlated with respect to one another. Consequently, the digital key encoded by Bob may be obtained by mixing the two signals. In some embodiments, the ability to decode the signal received via optical communication channel 131 may be granted by the temporal correlation existing between the two signals.

Upon receiving the digital key, Alice and Bob may initiate a secure direct communication using such key. As described previously, any suitable encryption algorithm may be used. The secure direct communication may comprise any suitable type of data, such as text, financial data, audio/video data, global positioning data, or any suitable combination thereof. In some embodiments, the secure data may be exchanged using optical communication channel 130 and/or optical communication channel 131 and/or optical broadband source 102 and/or optical delay element 104 and/or modulator 152. In other embodiments, once the digital key has been exchanged, the secure data may be transmitted/received using separate communication channels.

Figure 1B:
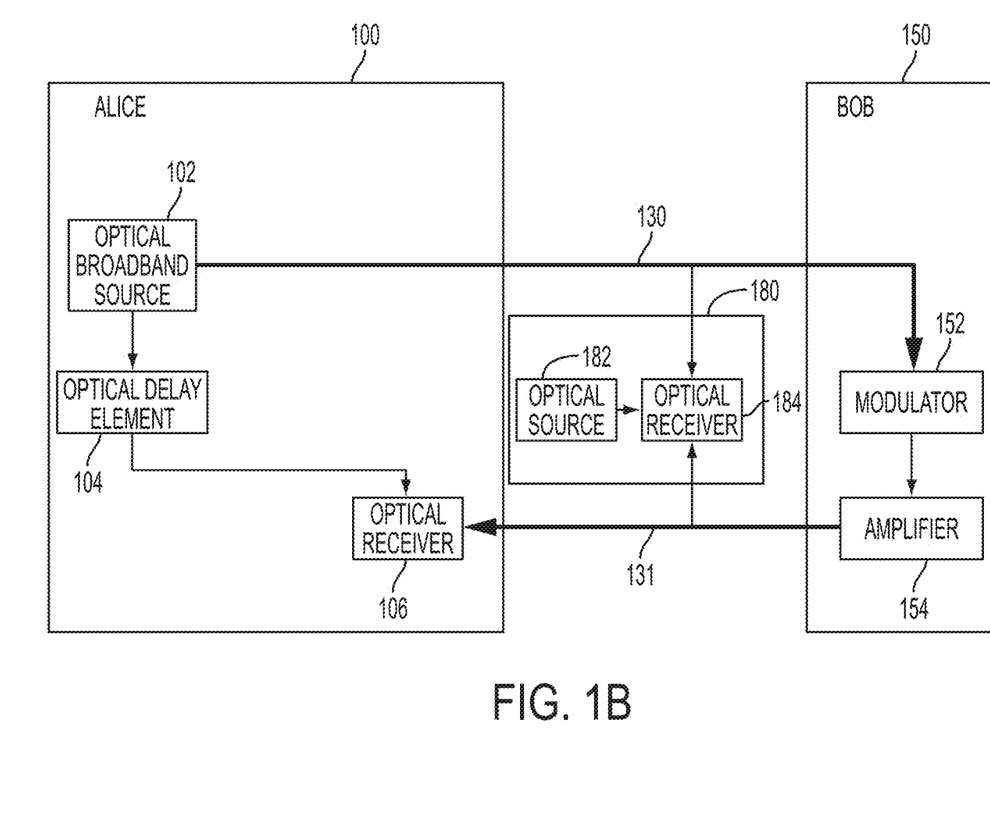
FIG. 1B is a block diagram illustrating an exemplary system for quantum key distribution and a passive attacker, according to some non-limiting embodiments.

FIG. 1B is a block diagram illustrating the system for quantum key distribution of FIG. 1A in the presence of a passive attacker, according to some non-limiting embodiments. Passive attacker 180 may attempt to tap a portion of the modulated optical broadband signal propagating along optical communication channel 130 and/or a portion of the modulated optical broadband signal propagating along optical communication channel 131, for example by using a coupler coupled to the channel. Passive attacker 180 may comprise an optical source 182 and an optical receiver 184. Passive attacker 180 may attempt to decode the message transmitted from Bob to Alice, by mixing the diverted optical signal with a reference signal using optical receiver 184. The reference signal may be generated with optical source 182. Even in the scenario in which optical source 182 is identical to optical broadband source 102, and optical receiver 184 is identical to optical receiver 106, the passive attacker may not be able to recover the digital key due to the fact that the mixed signals may not exhibit a sufficient temporal correlation with respect to one another. In some embodiments, the passive attacker may not be able to recover the key due to the noise introduced on optical communication channel 131 by amplifier 154.

Figure 1C:
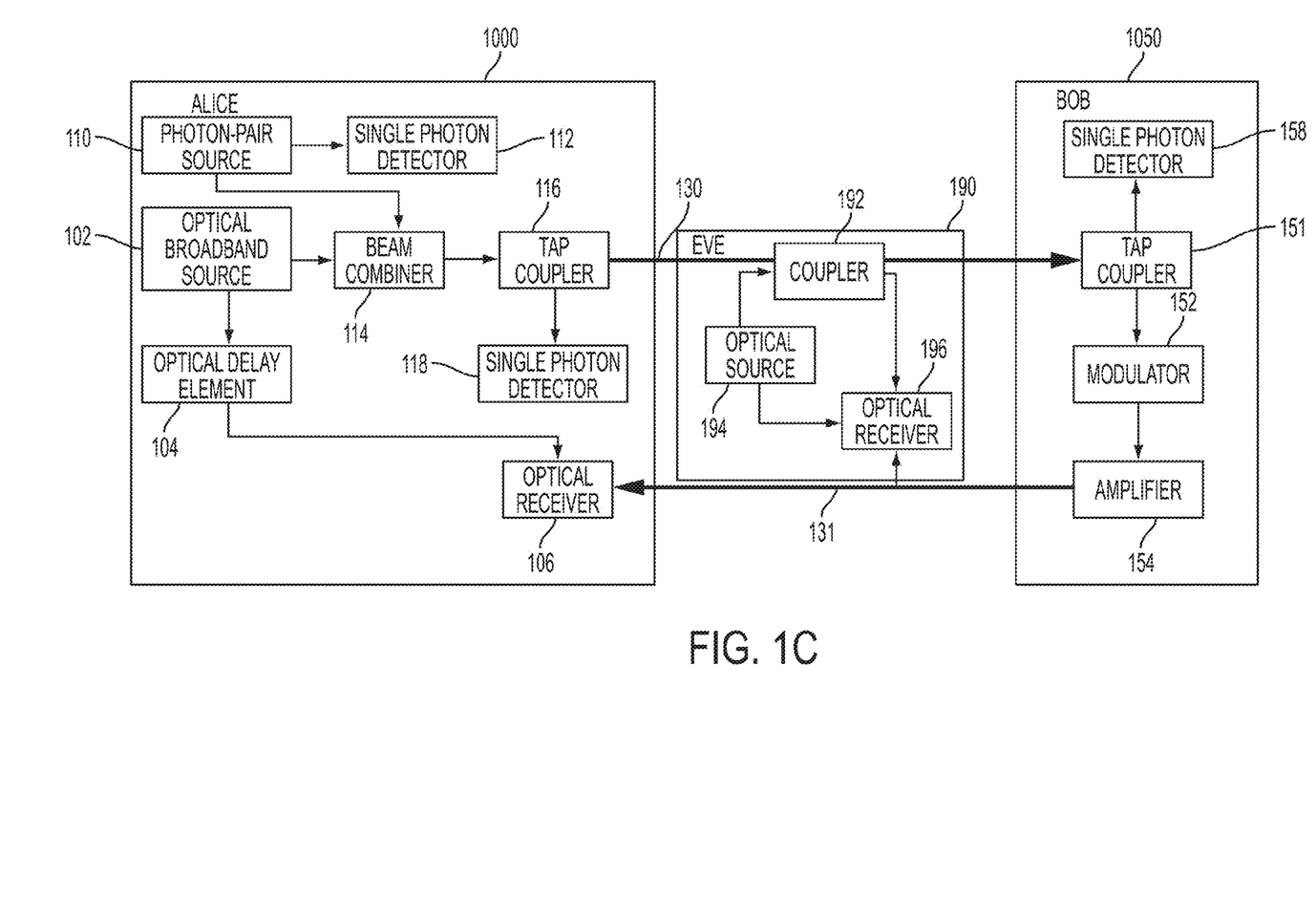
FIG. 1C is a block diagram illustrating an exemplary system for quantum key distribution and an active attacker, according to some non-limiting embodiments.

FIG. 1C is a block diagram illustrating a system for quantum key distribution in the presence of an active attacker. Active attacker 190, also referred to herein as the "eavesdropper" or "Eve", may attempt to deceive Bob by emulating Alice. Similarly to the system of FIG. 1A, transceivers 1000 and 1050 may be referred to as Alice and Bob, respectively. Transceiver 1000 may comprise optical broadband source 102, optical delay element 104, optical receiver 106, photon-pair source 110, single photon detector 112, beam combiner 114, tap coupler 116 and single photon detector 118. Optical source 102, optical delay element 104 and optical receiver 106 may be of the type and may be configured to operate as described in connection with FIG. 1A. Transceiver 1050 may comprise modulator 152, amplifier 154, tap coupler 151 and single photon detector 158. Modulator 152 and amplifier 154 may be of the type and may be configured to operate as described in connection with FIG. 1A.

Figure 4:
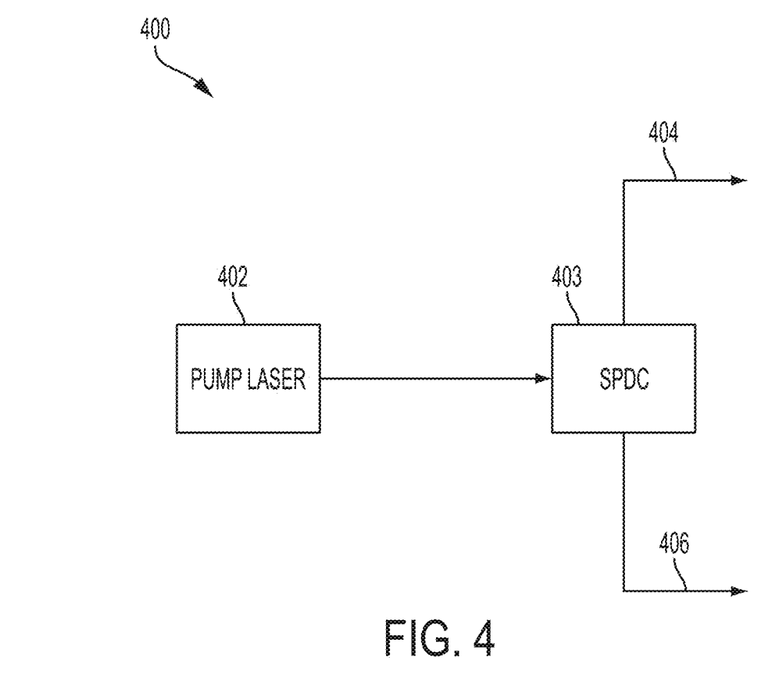
FIG. 4 is a block diagram illustrating an exemplary photon-pair source, according to some non-limiting embodiments.

Photon-pair source 110 may be configured to generate a pair of optical signals, which will be referred to herein as the "optical idler signal" and the "optical detection signal". In some embodiments, the optical idler and the optical detection signal may be entangled. For example, the two signals may have wavelengths, and/or momenta, that are tied by a predetermined relationship. In some embodiments, photon-pair source 110 may comprise a spontaneous parametric down-converter (SPDC), as illustrated in FIG. 4. Photon-pair source 400 may serve as photon-pair source 110, and may comprise pump laser 402 and spontaneous parametric down-converter (SPDC) 403. The optical signal generated by pump laser 402 will be referred herein as the "pump". SPDC 403 may be configured to receive the optical signal generated by pump laser 402 and to generate two optical signals 404 and 406, which may represent the optical idler signal and the optical detection signal, respectively. SPDC 403 may comprise an optical filter, such as a coarse wavelength division multiplexing (CWDM) filter, configured to spatially separate optical signals 404 and 406. In some embodiments, the sum of the frequencies of the optical signals 404 and 406 may be equal to the frequency of the pump. In other words, the sum of the inverse of the wavelengths of optical signals 404 and 406 may be equal to the inverse of the wavelength of the pump. In such embodiments, the wavelengths of the two wavelengths of the optical signals 404 and 406 may be entangled. By way of example and not limitation, if the wavelength of the pump is approximately 780 nm, the optical idler signal may have a wavelength of approximately 1570 nm and the optical detection signal may have a wavelength of approximately 1550 nm. If the wavelength of the optical pump is varied, the wavelengths of the optical signals 404 and 406 may vary accordingly, such that the relationship existing among the wavelengths is maintained. In some embodiments, the momenta of optical signals 404 and 406 may be entangled. In such embodiments, the sum of the momenta of optical signals 404 and 406 may be equal to the momentum of the pump. If the momentum of the pump is varied, the momenta of the optical signals 404 and 406 may vary accordingly, such the relationship existing among the momenta is maintained.

Referring back to FIG. 1C, the optical idler signal may be coupled to single photon detector 112, and the optical detection signal may be combined, using beam combiner 114, to the optical broadband signal generated by optical broadband source 102. Single photon detector 112 may comprise a superconducting nanowire single photon detector (SNSPD) in some embodiments, or an avalanche photodiode (APD) in other embodiments. Single photon detector 112 may be configured to detect the photon rate of the optical idler signal.

Beam combiner 114 may comprise a directional coupler in some embodiments. In some embodiments, the spectrum of the optical detection signal may overlap, at least in part, with the spectrum of the optical broadband signal. FIG. 2 illustrates an exemplary optical detection signal spectrum 206. In the non-limiting example, the optical detection signal may have a spectrum spanning from 1545 nm to 1561 nm. In the non-limiting example, the spectrum of the optical detection signal overlaps with the spectrum of the optical broadband signal between 1545 nm and 1558 nm. However, the application is not limited in this respect and the two spectra may overlap by any other suitable range greater than zero.

Referring back to FIG. 1C, the combined signals may be coupled to optical communication channel 130, and may be transmitted to Bob. In some embodiments, a portion of the combined signal may be coupled to single photon detector 118, using tap coupler 116. Tap coupler 118 may comprise a directional coupler in some embodiments.

The combined signal may be received at transceiver 1050, and may be modulated using modulator 152 and/or amplified with amplifier 154. In some embodiments, a portion of the combined signal may be coupled to single photon counter 158, using tap coupler 151. Tap coupler 151 may comprise a directional coupler in some embodiments. Single photon detector 158 may comprise a superconducting nanowire single photon detector (SNSPD) in some embodiments, or an avalanche photodiode (APD) in other embodiments. Single photon detector 158 may be configured to detect the photon rate of the combined signal. In some embodiments, the single photon detectors 112 and 158 may be collectively configured to perform a coincidence measurement between the corresponding signals. In some embodiments, the single photon detectors 112 and 118 may be collectively configured to perform a coincidence measurement between the corresponding signals. The coincidence measurement may provide an indication of the temporal correlation between the signals.

In some embodiments, an active attacker 190 may attempt to deceive Bob by providing Bob with a signal intended to emulate the broadband optical signal generated by Alice. For example, active attacker 190 may inject an intrusion signal generated by optical source 194 into optical communication channel 130, using coupler 192. In some embodiments, active attacker 190 may perform a Gaussian attack. In some embodiments, active attacker 190 may tap a portion of the modulated optical broadband signal, and may mix it, using optical receiver 196, with an intrusion signal generated with optical source 194.

In such circumstance, the coincidence measurement provided by single photon counters 112 and 158 may be degraded by the presence of the signal injected by the active attacker. In some embodiments, a value representing the intrusion signal may be obtained from the degradation in the coincidence measurement, for example, using a controller (not shown in FIG. 1C). The controller may be disposed within Alice and/or within Bob. Based on the value representing the intrusion signal, it may be concluded that an active attack is under way. For example, the value representing the intrusion signal may be compared to a threshold. If such value is greater than the threshold, it may be concluded that an active attack is under way. The photon rates measured using single photon counters 112, 118, and 158B and the coincidence measurement made with single photon counters 112 and 118 may be used as a reference to calibrate the system.

In some embodiments, the fraction $f_E$ of the light received by Bob that is injected by Eve may be equal to:

$$f_E = 1 - (C_{IB} - (S_B S_I T_G)/S_B)/(C_{IA} - (S_A S_I T_G)/S_A)$$

where $C_{IB}$ is the coincidence rate between single photon detectors 158 and 112, $C_{IA}$ is the coincidence rate between single photon detectors 118 and 112, $S_B$ is the photon rate measured by single photon detector 158, $S_A$ is the photon rate measured by single photon detector 118, $S_I$ is the photon rate measured by single photon detector 112, and $T_G$ is the time duration during which the coincidence measurement is performed. In some embodiments, $f_E$ may be compared to a threshold. If $f_E$ is greater than the threshold, it may be concluded that an active attack is under way.

The system for distributing quantum digital key, and the system for detecting the presence of active attackers described herein, may be used in various military and commercial applications, such as in transmission of financial data, intelligence data, identity data, global positioning data, or any other suitable type of data. The system for distributing quantum digital key, and the system for detecting the presence of active attackers described herein, may be further used for remote access, storage privacy, or commercial espionage and/or piracy. The system for distributing quantum digital key, and the system for detecting the presence of active attackers described herein, may be used for secure low earth orbit (LEO) communications, including ground-to-satellite, satellite-to-ground and satellite-to-satellite.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, system upgrade, and/or method described herein. In addition, any combination of two or more such features, systems, and/or methods, if such features, systems, system upgrade, and/or methods are not mutually inconsistent, is included within the inventive scope of the present disclosure.

The terms "about," "approximately," and "substantially" may be used to refer to a value, and are intended to encompass the referenced value plus and minus variations that would be insubstantial. The amount of variation could be less than 5% in some embodiments, less than 10% in some embodiments, and yet less than 20% in some embodiments. In embodiments where an apparatus may function properly over a large range of values, e.g., one or more orders of magnitude, the amount of variation could be as much as a factor of two. For example, if an apparatus functions properly for a value ranging from 20 to 350, "approximately 80" may encompass values between 40 and 160.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed is:

1. A method for securely distributing a quantum digital key using an optical communication system, the method comprising:

generating an optical broadband signal with an optical broadband source;

transmitting a first portion of the optical broadband signal with less than one photon/(sec-Hz) through a first optical communication channel;

time-delaying a second portion of the optical broadband signal with an optical delay element, wherein the time-delaying is based at least in part on a characteristic of the first optical communication channel;

receiving a modulated optical broadband signal having a plurality of temporal modes and encoded with the quantum digital key through a second optical communication channel, wherein at least one of the plurality of temporal modes carries a portion of the key, and where the plurality of temporal modes being representative of a characteristic of the optical broadband signal; and obtaining the quantum digital key by mixing the modulated optical broadband signal with the delayed second portion of the optical broadband signal.

2. The method of claim 1, wherein the second portion of the optical broadband signal is time-delayed by an amount that is equal to a roundtrip delay, plus or minus a mismatch error that is less than a coherence time of the optical broadband source.

3. The method of claim 1, wherein the optical broadband signal has an optical bandwidth that is at least ten times greater than a modulation rate associated with the modulated optical broadband signal.

4. The method of claim 1, wherein the first optical communication channel comprises a first optical fiber and the second optical communication channel comprises a second optical fiber.

5. The method of claim 1, wherein the first optical communication channel and the second optical communication channel define a free space optical link.

6. The method of claim 1, wherein the modulated optical signal exhibits a signal-to-noise ratio that is less than 1.

7. The method of claim 1, wherein the first portion of the optical broadband signal has a brightness that is between 10-4 photons/(sec-Hz) and 1 photon/(sec-Hz).

8. The method of claim 1, wherein the second portion of the optical broadband signal has a brightness that is greater than 10 photons/(sec-Hz).

9. The method of claim 1, further comprising:

generating an optical idler signal and an optical detection signal such that the optical idler signal and the optical detection signal are temporally correlated;

transmitting the optical detection signal through the first optical communication channel; and monitoring the first optical communication channel by performing a coincidence measurement.

10. The method of claim 9, wherein performing the coincidence measurement comprises obtaining a value representing an intrusion signal by comparing a first photon count associated with the optical idler signal with a second photon count associated with the optical broadband signal.

11. The method of claim 9, further comprising determining that an active attack has occurred if the value representing the intrusion signal is greater than a threshold.

12. The method of claim 9, wherein the optical detection signal spectrally overlaps, at least in part, the optical broadband signal.

13. An optical communication system for securely distributing a quantum digital key, comprising:

an optical broadband source optically coupled to an optical communication channel, wherein the optical broadband source is configured to generate an optical broadband signal and to transmit a first portion of the optical broadband signal through the optical communication channel;

an optical delay element optically coupled to the optical broadband source, wherein the optical delay element is configured to delay a second portion of the optical broadband signal, generated by the optical broadband source, at least in part based on a characteristic of the optical communication channel; and an optical receiver optically coupled to the optical delay element, wherein the optical receiver is configured to:

receive a modulated optical broadband signal having a plurality of temporal modes and encoded with a quantum digital key, wherein at least one of the plurality of temporal modes carries a portion of the key, the plurality of temporal modes being representative of a characteristic of the optical broadband signal, and obtain the quantum digital key by mixing the delayed second portion of the optical broadband signal with the modulated optical broadband signal.

14. The optical communication system of claim 13, wherein the optical delay element exhibits a time delay that is equal to a roundtrip delay, plus or minus a mismatch error that is less than a coherence time of the optical broadband source.

15. The optical communication system of claim 13, wherein the optical broadband source comprises an erbium-doped fiber amplifier (EDFA).

16. The optical communication system of claim 13, further comprising:

a photon-pair source configured to generate an optical detection signal and an optical idler signal, wherein the optical detection signal and the optical idler signal are entangled;

a single photon detector optically coupled to the photon-pair source, wherein the single photon detector is configured to count photons associated with the optical idler signal;

a beam combiner configured to couple the first portion of the optical broadband signal with the optical detection signal.

17. The optical communication system of claim 16, wherein the photon-pair source comprises a spontaneous parametric downconverter (SPDC).

18. The optical communication system of claim 13, wherein the optical delay element comprises at least one selected from the group consisting of an optical fiber, a Bragg grating, a ring resonator, an apodized grating and a photonic crystal.

* * * * *